United States Patent
Li et al.

(10) Patent No.: US 10,404,129 B2
(45) Date of Patent: Sep. 3, 2019

(54) ELECTRIC MOTOR

(71) Applicant: JOHNSON ELECTRIC INTERNATIONAL AG, Murten (CH)

(72) Inventors: Wen Liang Li, Shenzhen (CN); James Ching Sik Lau, Hong Kong (CN); Kwong Yip Poon, Hong Kong (CN); Wan You Wang, Shenzhen (CN); Ji Dong Chai, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 703 days.

(21) Appl. No.: 14/847,555

(22) Filed: Sep. 8, 2015

(65) Prior Publication Data

US 2016/0072356 A1 Mar. 10, 2016

(30) Foreign Application Priority Data

Sep. 5, 2014 (CN) .......................... 2014 1 0452501

(51) Int. Cl.

| | |
|---|---|
| *H02K 5/14* | (2006.01) |
| *F04D 25/06* | (2006.01) |
| *H01R 39/38* | (2006.01) |
| *H01R 39/40* | (2006.01) |
| *H02K 13/10* | (2006.01) |
| *F04D 17/16* | (2006.01) |
| *F04D 29/28* | (2006.01) |
| *F04D 29/58* | (2006.01) |

(52) U.S. Cl.
CPC ............. *H02K 5/148* (2013.01); *H01R 39/38* (2013.01); *H01R 39/40* (2013.01); *H02K 5/146* (2013.01); *H02K 13/10* (2013.01); *F04D 17/16* (2013.01); *F04D 25/06* (2013.01); *F04D 25/0606* (2013.01); *F04D 25/0693* (2013.01); *F04D 29/281* (2013.01); *F04D 29/5806* (2013.01)

(58) Field of Classification Search
CPC .......... H02K 5/146; H02K 5/148; H02K 9/06; H02K 13/10; H01R 39/38; H01R 39/40; H01R 39/381; F04D 25/0693
USPC ....................................... 417/423.7
See application file for complete search history.

(56) References Cited

U.S. PATENT DOCUMENTS 3,003,074 A * 10/1961 Finsterwalder ........ H02K 5/148
310/239
3,145,316 A * 8/1964 Page ...................... H01R 39/40
310/246

(Continued)

FOREIGN PATENT DOCUMENTS

| EP | 1852947 | 11/2007 |
|---|---|---|
| JP | 2010035272 | 2/2010 |

*Primary Examiner* — Peter J Bertheaud
(74) *Attorney, Agent, or Firm* — Muncy, Geissler, Olds & Lowe, P.C.

(57) ABSTRACT

An electric motor for a blower and the like has a commutator and a brush assembly for making electrical contact with the commutator. The brush assembly includes a brush holder and a brush slidably mounted to the brush holder. The brush holder includes a brush holder plate and a side portion extending from the brush holder plate. The brush is arc-shaped and includes a first surface contacting the brush holder plate and a second surface contacting the side portion of the brush holder. The side portion of the brush holder has a number of ribs contacting the second surface of the brush.

17 Claims, 8 Drawing Sheets

(56) References Cited

U.S. PATENT DOCUMENTS

| | | | | |
|---|---|---|---|---|
| 3,654,504 | A * | 4/1972 | Susdorf | H02K 5/148 310/239 |
| 5,434,463 | A * | 7/1995 | Horski | H02K 5/148 310/136 |
| 5,977,666 | A * | 11/1999 | Horski | H01R 39/38 310/238 |
| 6,441,533 | B1 * | 8/2002 | Grosskopf | H01R 39/415 310/239 |
| 7,683,519 | B2 * | 3/2010 | Finkenbinder | H01R 39/40 310/239 |
| 7,863,519 | B2 | 1/2011 | Steinich | |
| 2006/0192449 | A1 * | 8/2006 | Noda | F04D 25/082 310/88 |
| 2006/0226730 | A1 * | 10/2006 | Fulton | H01R 39/38 310/239 |
| 2011/0031823 | A1 * | 2/2011 | Schroeder | H02K 5/148 310/43 |

* cited by examiner

ELECTRIC MOTOR

CROSS REFERENCE TO RELATED APPLICATIONS

This non-provisional patent application claims priority under 35 U.S.C. § 119(a) from Patent Application No. 201410452501.3 filed in The People's Republic of China on Sep. 5, 2014, the entire contents of which are hereby incorporated by reference.

FIELD OF THE INVENTION

This invention relates to an electric motor and in particular, to a brush assembly for an electric motor having a curved or arcuate brush.

BACKGROUND OF THE INVENTION

In known brush assemblies for an electric motor, a brush abuts against a surface of a commutator through which electricity is supplied to windings of the rotor during operation of the motor. The brush is formed from a carbon based material that is relatively easily worn compared to the commutator. If the carbon brush is worn severely, poor contact between the brush and commutator may occur, which affects the delivery of electricity and hence cause abnormal operation of the motor. Therefore, it is desirable to increase the usable life of the carbon brush. High temperature affects the life of the brush. During operation of the motor, friction between the brush and other components, especially the commutator, generates a large amount of heat. The electric current flowing through the brush also generates heat. Therefore, increasing the dissipation of heat from the carbon brush can lead to an increase in brush life.

SUMMARY OF THE INVENTION

Hence there is a desire for a brush assembly that has a longer brush life.

Accordingly, in one aspect thereof, the present invention provides a brush assembly for an electric motor, comprising a brush holder and a brush slidably mounted to the brush holder, the brush holder comprising a brush holder plate and a side portion extending from the brush holder plate, the brush being arc-shaped and comprising a first surface contacting the brush holder plate and a second surface contacting the side portion of the brush holder, wherein the side portion of the brush holder comprises a plurality of ribs contacting the second surface of the brush.

Preferably, a through hole is formed between adjacent ribs of the side portion of the brush holder.

Preferably, surfaces of the ribs that contact the brush are curved surfaces.

Preferably, the brush holder plate defines a plurality of openings there through aligning with the first surface of the brush.

Preferably, the brush holder plate has at least two elongated projections that support the first surface of the brush and have a shape corresponding to the shape of the brush.

Preferably, at least part of the openings of the brush holder plate are formed between the two elongated projections.

Preferably, the brush comprises a first end for contacting a commutator of a motor, and a second end opposite to the first end, the brush assembly further comprises a resilient element contacting the second end of the brush to bias the brush toward the first end of the brush.

According to a second aspect, the present invention provides an electric motor comprising a stator, a rotor rotatable relative to the stator, a commutator fixed to the rotor, and a brush assembly as described above, engaged with the commutator, the stator comprising stator windings.

According to a third aspect, the present invention provides a blower comprising a motor as described above, and a fan driven by the motor.

Preferably, the brush assembly is disposed between the stator and the fan, the stator has stator windings, the brush holder defines an opening aligned with the stator windings, and the brush assembly is disposed at an axial end of the motor adjacent to the fan.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear.

Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
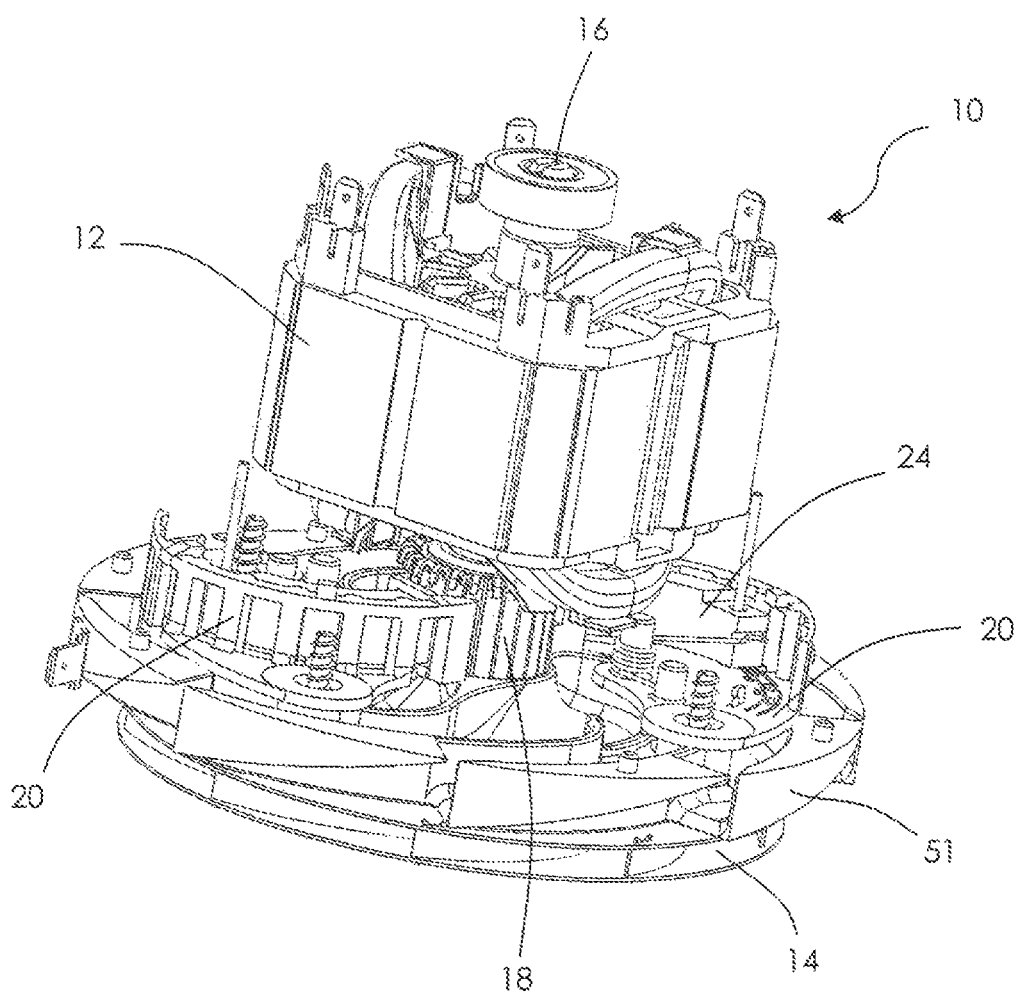
FIG. 1 is a perspective view of a blower incorporating a motor according to one embodiment, with the outer housing of the blower removed.

FIG. 1 is a perspective view of a blower incorporating a motor according to one embodiment of the present invention. The blower is shown without an outer housing and shroud. The blower 10 includes a motor 12 and a fan 14 driven by the motor 12. The motor 12 includes a rotor having a shaft 16, and the fan 14 is fixedly mounted to the shaft 16. The rotor includes a commutator 18 connected to rotor windings. A brush assembly 20 engages the commutator 18 to supply electricity to the rotor windings. The fan 14 is mounted to an axial end of the motor 12 adjacent the brush assembly 20. This configuration allows the brush assembly 20 to be closer to the fan 14, such that the airflow generated by the fan 14 may be used to cool the brush assembly 20, thus enhancing heat dissipation of the brush assembly 20.

Figure 2:
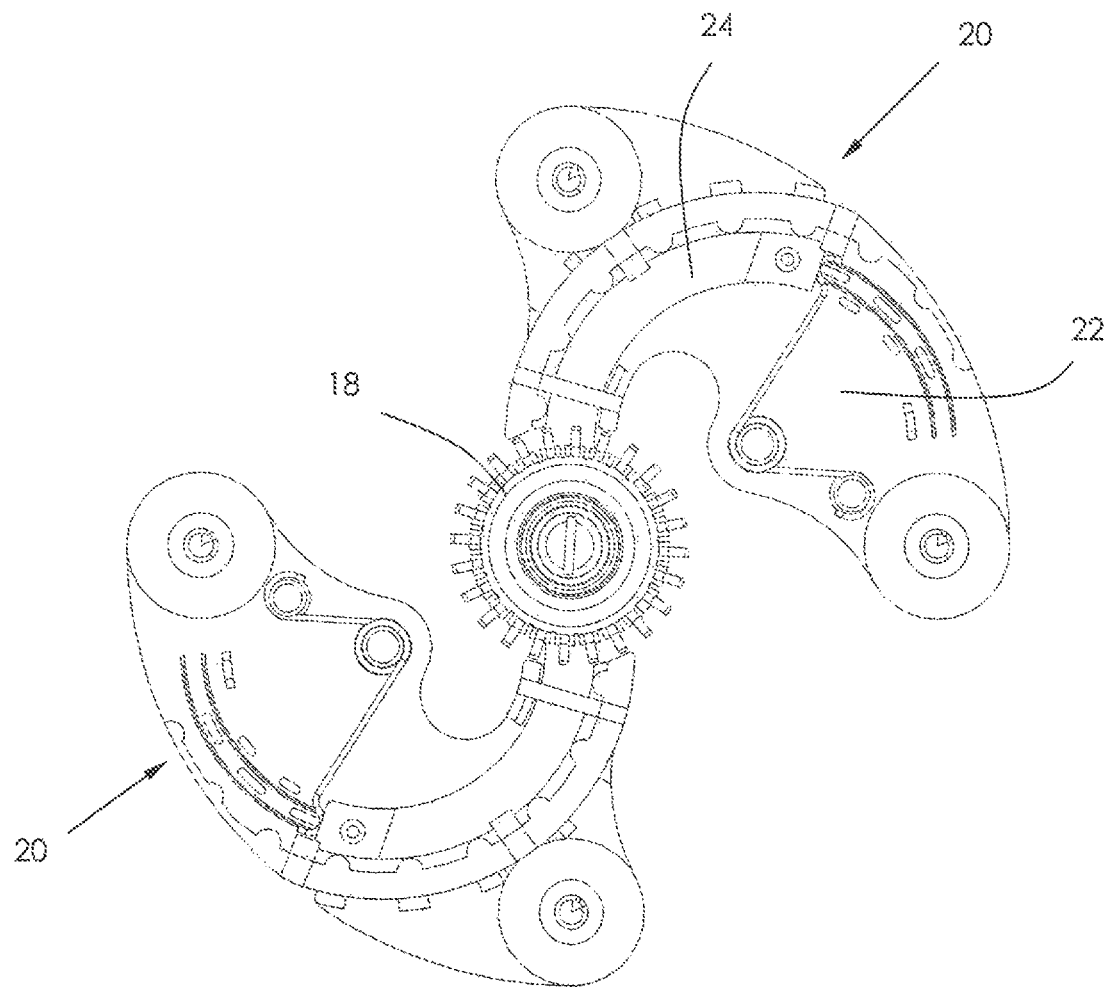
FIG. 2 is a plan view of a brush assembly and a commutator of the blower of FIG. 1.
Figure 3:
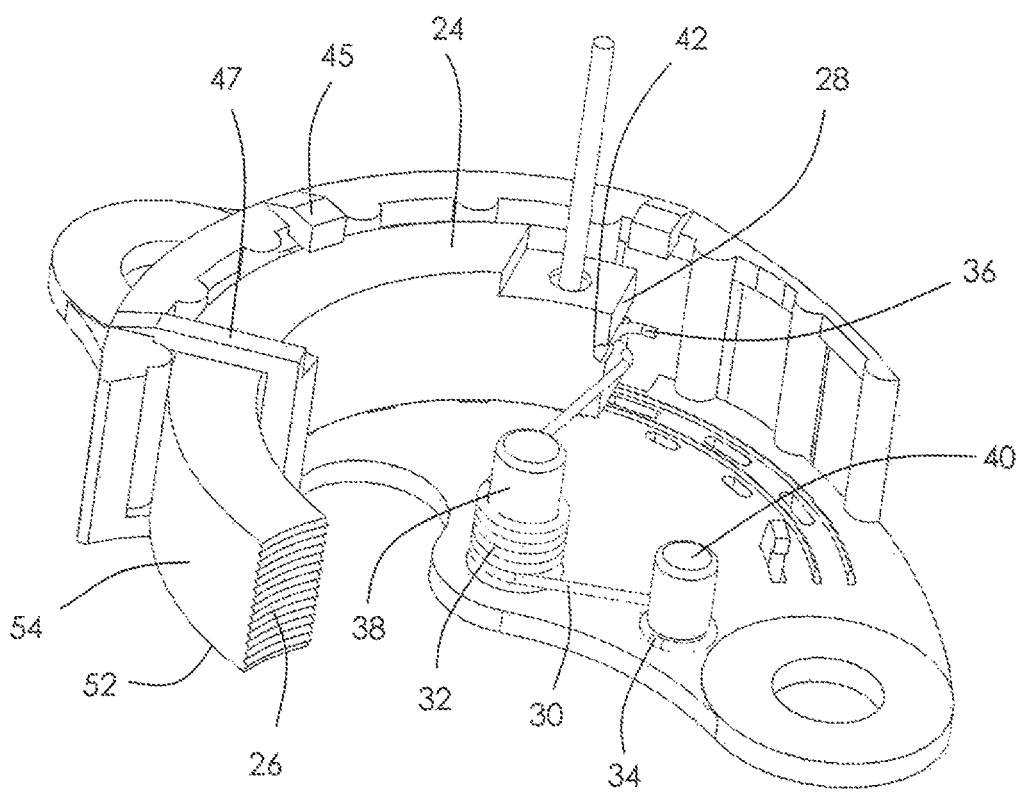
FIG. 3 is an enlarged, perspective view of part of the brush assembly of FIG. 2.

FIG. 2 is a plan view of the brush assembly and commutator of FIG. 1. FIG. 3 is an enlarged, perspective view of a part of the brush assembly. The brush assembly 20 includes a brush holder 22 and brushes 24 mounted on the brush holder 22. Brushes of the brush assembly 20 slidably contact the commutator 18. In the illustrated embodiment, the brush holder 22 includes two separate brush holder parts. The number of the brushes 24 is equal to the number of the brush holder parts, and each brush 24 is mounted on a corresponding one of the brush holder parts. One advantage of the segmented or separate-type brush holder 22 is the capability of reducing material cost of the brush holder 22. In other embodiments, the brush holder 22 may be an integrated brush holder having multiple brush holder portions, with the brushes 24 mounted on the respective brush holder portions.

In the illustrated embodiment, each brush 24 is arc-shaped. The arc shape increases the actual length of the brush within the same length space, compared with a straight brush, thus effectively prolonging the life of the brush. The brush 24 includes a first end 26 contacting the commutator 18 of the motor 12 and a second end 28 opposite to the first end 26. The brush assembly 20 further includes a resilient element 30 that urges each brush 24 towards and into contact with the commutator. As such, as the first end 26 of the brush 24 wears, the resilient element 30 pushes the brush 24 toward the commutator 18, such that electrical contact between the brush 24 and the commutator 18 is maintained.

Referring to FIG. 3, in the illustrated embodiment, the resilient element 30 is two torsion springs 30, one for each brush. The torsion spring 30 includes a coiled portion 32 and two ends 34, 36 extending from the coiled portion 32. The coiled portion 32 is attached around a positioning post 38 on the brush holder 22. One end 34 of the torsion spring 30 is fixed to a locking post 40 on the brush holder 22, and the other end 36 is connected to or abuts against the second end 28 of the brush 24, to bias the brush 24 toward the first end 26 thereof. Preferably the second end 28 of the brush has a groove 42 for receiving the other end of the spring.

It is to be understood that the torsion spring 30 may be mounted in another suitable manner. For example, the coiled portion 32 may be fixed on the positioning post 38 such that the coiled portion 32 cannot rotate relative to the positioning post 38. In this case, it is not necessary to include the locking post 38 or another structure for fixing the end 34 on the brush holder 22.

While the resilient element is illustrated as torsion springs 30 in the embodiment above, it is to be understood, however, that the resilient element may also be implemented as another type of resilient element, as long as it can urge the brushes into contact with the commutator.

Figure 4:
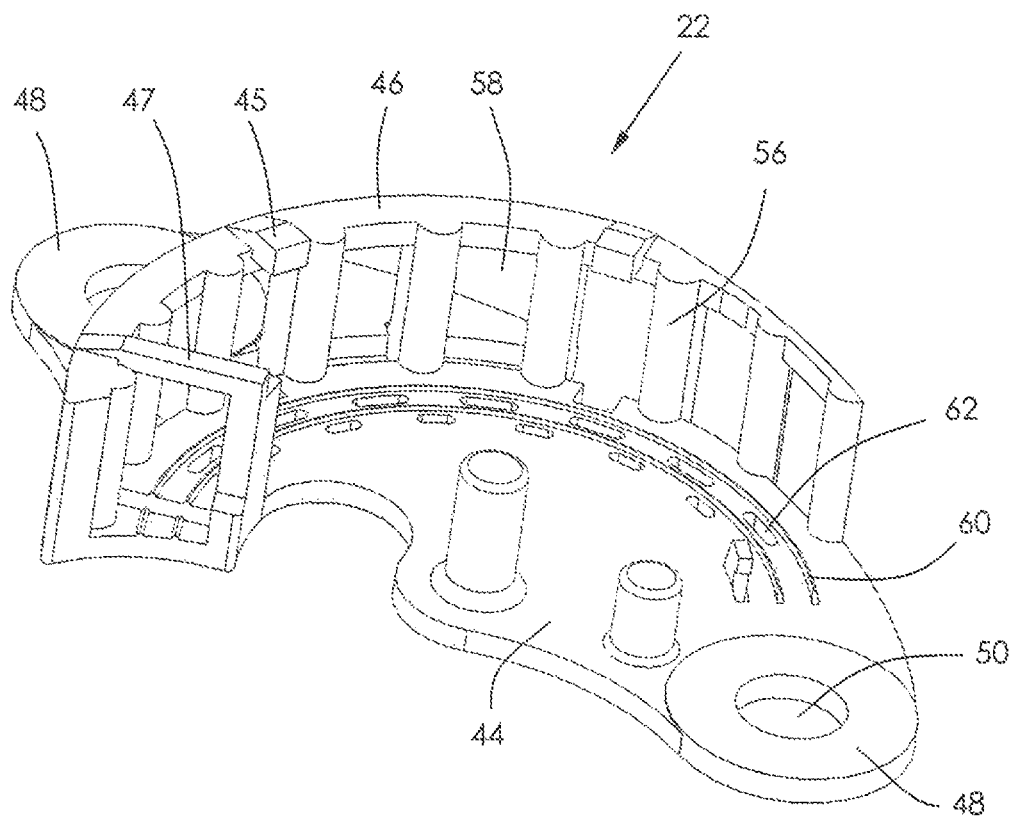
FIG. 4 is a perspective view of a brush holder part, being a part of the brush assembly of FIG. 3.
Figure 5:
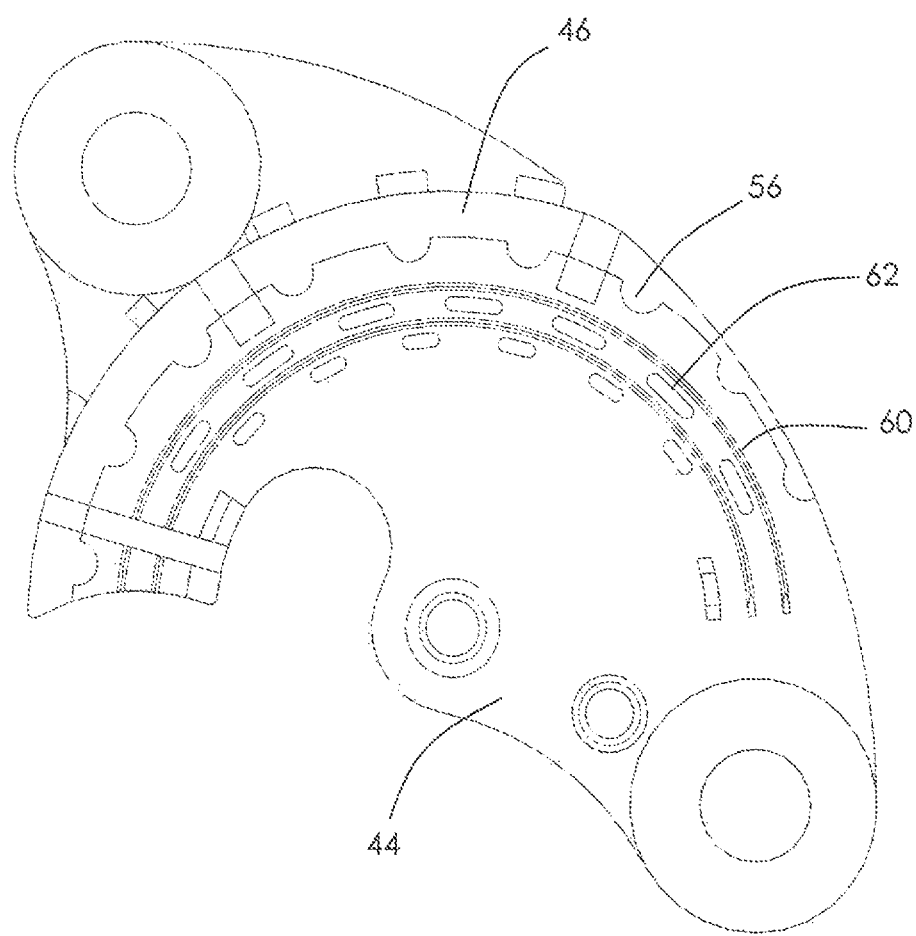
FIG. 5 is a plan view of the brush holder part of FIG. 4.

FIG. 4 is a perspective view of one brush holder part, and FIG. 5 is a plan view of the brush holder part. The brush holder 22 includes a brush holder plate 44, a side portion 46 extending from the brush holder plate 44, and a brush holder mounting portion 48.

The brush holder mounting portion 48 has a mounting hole 50. The brush holder 22 is fixed to an outer housing 73 (FIG. 6) of the blower 10 by a fastener such as a screw passing through the mounting hole 50. In the illustrated embodiment, an air diffuser 51 is disposed between the fan 14 and the brush assembly 20.

The brush 24 is arc-shaped and includes a first surface 52 contacting the brush holder plate 44 and a second surface 54 contacting the brush holder side portion 46. In the illustrated embodiment, the first surface 52 is a bottom surface of the brush 24. In some other embodiments, the first surface 52 may be a top surface of the brush depending on the orientation of the motor. The second surface 54 is a side surface of the brush 24. Because the brush 24 is arc-shaped, the side surface 54 of the brush 24 is also an arc surface. The brush holder side portion 46 includes a plurality of ribs 56 projecting toward the brush 24, and the ribs 56 contact the side surface 54 of the brush 24. Because it is the ribs 56, rather than the whole side portion 46, that contact the side surface 54 of the brush 24, the contact area is reduced, which effectively reduces the friction between the moving brush and the brush holder side portion 46 and hence the amount of heat generated from the friction. This smoothens the movement of the brush and reduces the wear of the brush side surface 54, thus prolonging the life of the brush.

In addition, in the illustrated embodiment, the ribs 56 have curved contact surfaces which can further reduce the wear of the brush 24.

In the illustrated embodiment, a through hole 58 is formed between adjacent ribs 56. As such, the heat generated by the brush 24 during operation of the motor 12 can be better dissipated. In particular, in the application of the blower 10 illustrated, the fan 14 is disposed at a side of the motor 12 close to the brush assembly 20. As such, the airflow generated by the fan 12 can flow through these through holes 58 and over the brush 24 to dissipate heat of the brush 24.

In the illustrated embodiment, the brush holder plate 44 has multiple elongated projections 60 for supporting the bottom surface 52 of the brush 24. The elongated projections 60 have an arc shape that corresponds to the arc shape of the brush. The provision of the elongated projections 60 reduces friction between the brush holder plate and the bottom surface 52 of the brush 24 and the heat generated from the friction, which smoothens the movement of the brush and reduce the wear of the brush bottom surface 52, thus prolonging the lifespan of the brush 24. The elongated projections 60 space the bottom surface 52 of the brush from the upper surface (i.e. the surface facing the brush bottom surface 52) of the brush holder plate by a distance, which also facilitates the heat dissipation of the brush 24. In addition, the elongated projections 60 can also function as rails for guiding the movement of the brush 24.

In addition, in the illustrated embodiment, the brush holder plate 44 facing the brush bottom surface 24 defines a plurality of openings 62 through the brush holder plate 44. The airflow generated by the fan 14 can flow through the openings 64 and over the brush 24 to dissipate heat from the brush 24. These openings 62 are distributed along the projections 60. In this embodiment, two projections 60 are formed corresponding to each brush 24. Some of the openings 62 are defined between the two projections 60, and the remaining openings 62 are defined outside the two projections 60.

While two projections 60 are illustrated in the embodiment above, it should be understood that the number of the projections 60 is not intended to be limited to a particular number. If the openings 62 are disposed along the projections 60, the present invention sets forth no restriction as to the number and position of the openings, as long as they are able to guide the airflow to dissipate heat from the brush 24.

The brush holder side portion 46 forms a plurality of guide blocks 45 for locating the top surface of the brush 24. One end of the brush holder 22 close to the commutator forms a window 47 allowing one end of the brush 24 to extend through the window 47 to slidably contact the commutator 18. The guide blocks 45, window 47 and brush holder plate 44 cooperate to limit the movement of the brush 24 in the axial direction of the brush 24.

Figure 6:
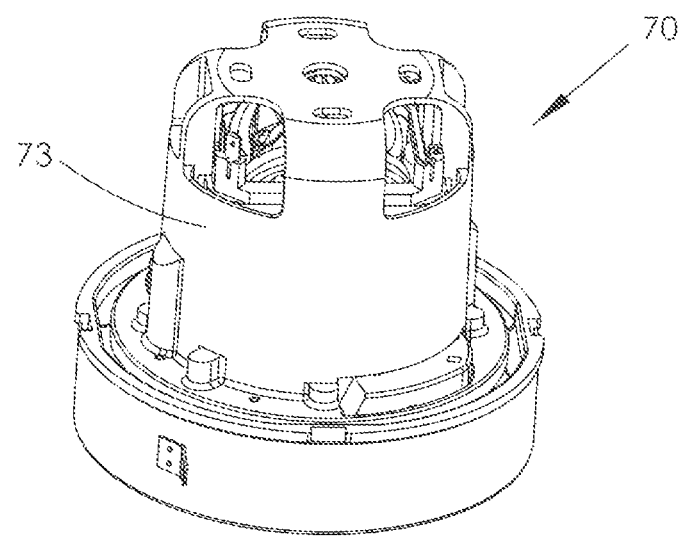
FIG. 6 is a perspective view of a blower according to a second embodiment.
Figure 7:
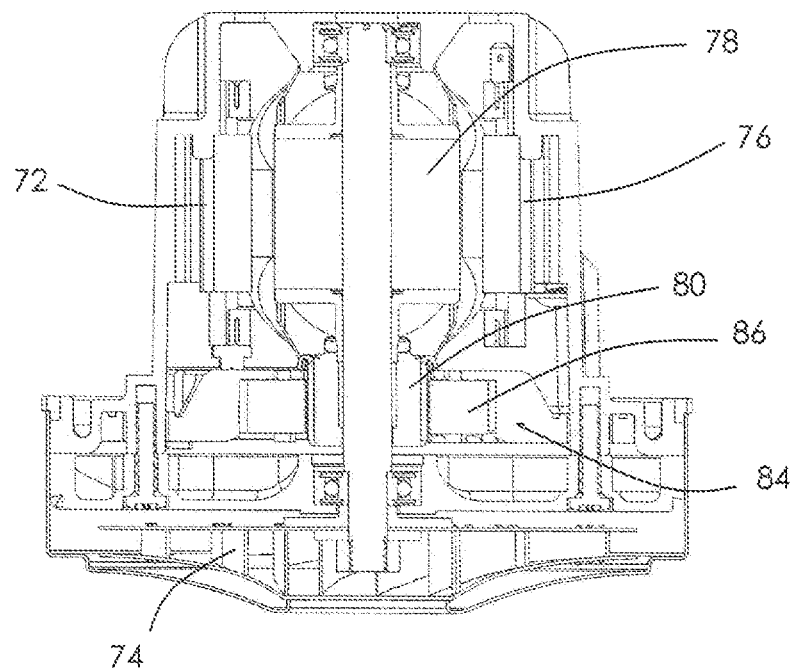
FIG. 7 is a sectional view of the blower of FIG. 6.
Figure 8:
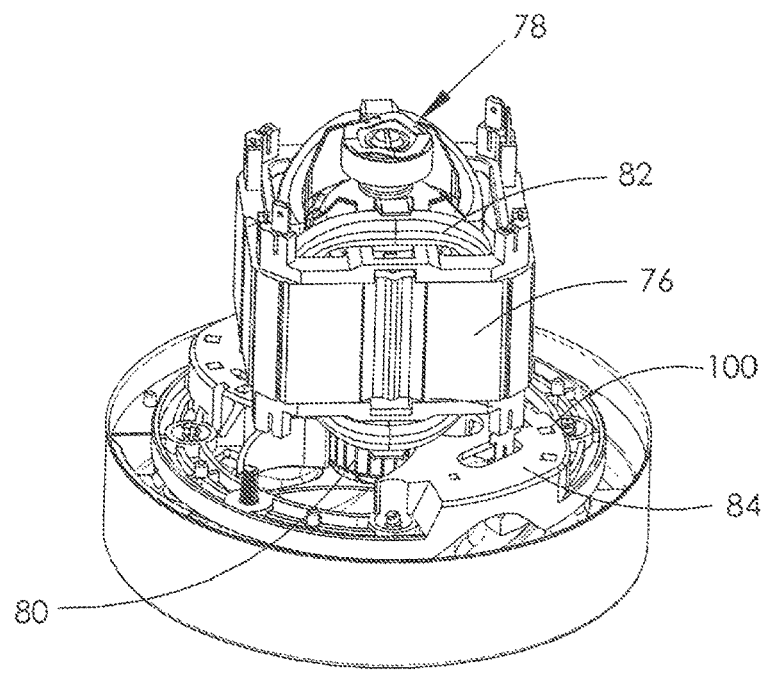
FIG. 8 is a perspective view of the blower of FIG. 6, with an outer housing removed.
Figure 9:
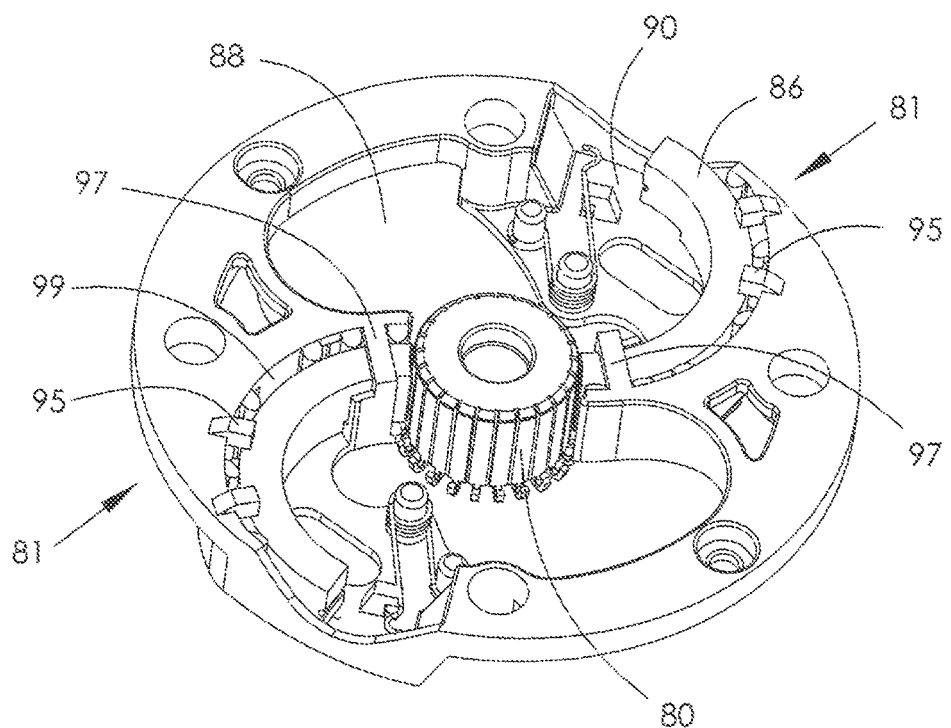
FIG. 9 is a perspective view of the brush assembly and commutator of the blower of FIG. 6.
Figure 10:
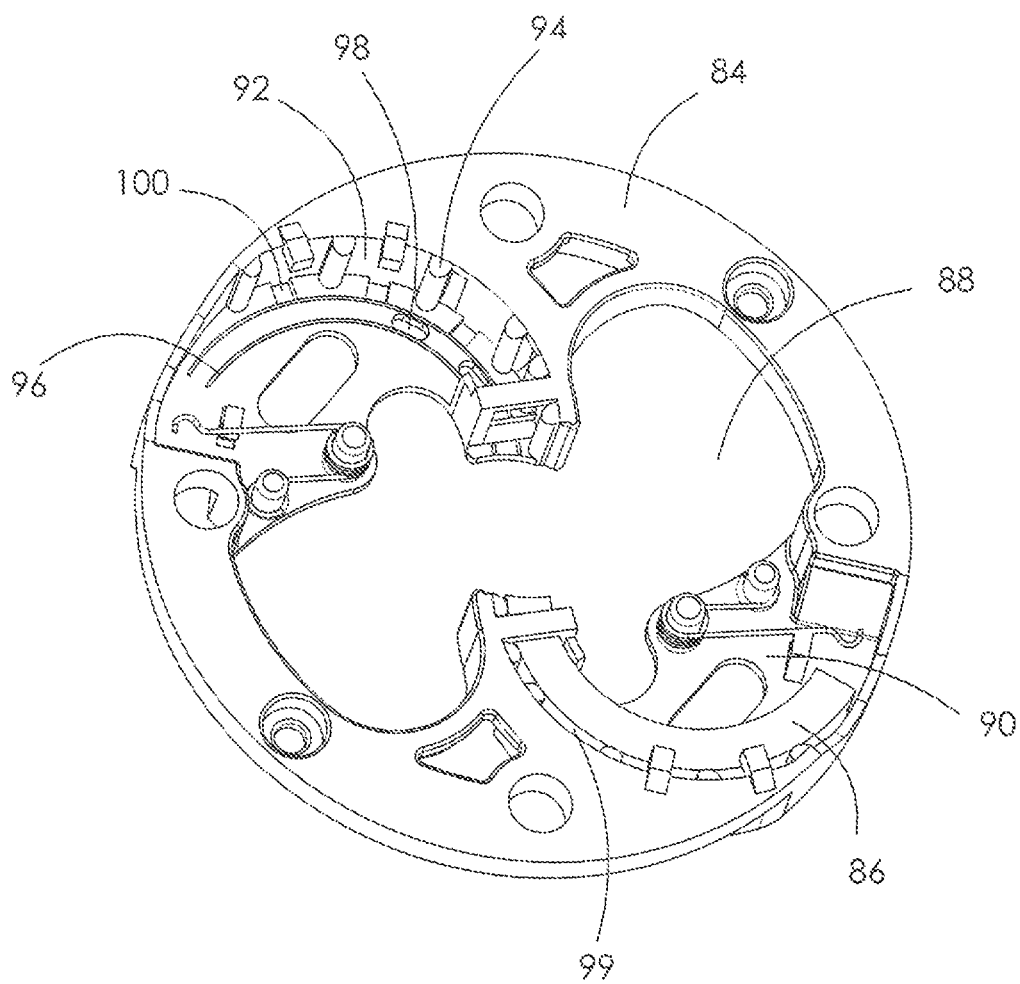
FIG. 10 illustrates a brush holder of the brush assembly of FIG. 9.

FIG. 6 to FIG. 10 illustrate a blower according to another embodiment. Referring to FIG. 6 to FIG. 8, the blower 70 includes a motor 72 and a fan 74 driven by the motor 72. The motor 72 includes a stator 76, a rotor 78 rotatable relative to the stator 76, a commutator 80 fixed to the rotor 78, and a brush assembly 81 engaged with the commutator 80. The stator 76 includes stator windings 82. The brush assembly 81 includes a brush holder 84 and brushes 86 mounted to the brush holder 84. The engagement of the brush 86 with the commutator 80 has been described in the above embodiment and therefore its explanation is not repeated herein.

The brush assembly 81 is disposed between the stator 76 and the fan 74. The brush holder 84 defines at least one opening 88 (FIG. 9 and FIG. 10) aligned with the stator windings 82. As such, the airflow generated by the fan 74 can flow through the opening 88 to dissipate heat from the stator windings 82.

In the illustrated embodiment, the brush holder 84 is disposed between the brushes 86 and the stator 76, and the brushes 86 are disposed between the fan 74 and the brush holder 84. As such, the airflow generated by the fan 74 can dissipate heat from the brushes 86. At the same time, as described above, a portion of the airflow can flow through the opening 88 of the brush holder 84 to dissipate heat from the stator windings.

The brush holder 84 includes a brush holder plate 90 and a side portion 92 extending from the brush holder plate 90. The side portion 92 forms a plurality of ribs 94 contacting the brush 86. A through hole is formed between adjacent ribs 94. Therefore, the brush 86 and the brush holder side portion 92 are in non-continuous contact with each other, which reduces the contact area between the brush 86 and the brush holder 84 and hence the friction there between. Optionally, elongated projections 96 are formed on the brush holder plate 90, and openings 98 are formed around the projections 96. A top of the side portion 92 remote from the brush holder plate 90 forms a plurality of guide blocks 95. One end of the brush holder 84 close to the commutator 80 forms a window 97. The construction and function of the brush holder plate 90, side portion 92, ribs 94, guide blocks 95, projections 96, window 97 and openings 98 may be the same as those in the previous embodiment and explanation thereof is not repeated herein.

The brush holder 84 is illustrated in this embodiment as an integrated brush holder 84 having two brush holder portions. Each brush holder portion defines an opening 88 through the brush holder plate 90. It is to be understood that the number of the openings 88 is not intended to be limited to a particular number. In some other embodiments, the brush holder plate 90 may also be a segmented brush holder as described in the previous embodiment.

A gap 99 is formed between the side portion 92 of the brush holder 84 and the brush 86. The portion of the brush holder plate 90 between the side portion 92 and the brush 86 defines one or more through holes 100. The through holes 100 in the brush holder plate 90 and the through holes between the ribs 94 allow the airflow to flow there through to dissipating the heat of the side surface of the brush 86. In the present embodiment, the gap 99 between the brush holder side portion 92 and the brush 86 is created because of the presence of the ribs 94. It is to be understood the gap may also be formed in another manner.

In summary, the present invention provides a blower, a motor and a brush assembly of the motor. The life of the brush can be effectively increased by reducing the contact area between the brush and the brush holder plate, and/or between the brush and the brush holder side portion. By forming through holes between adjacent ribs of the brush holder side portion, forming openings through the brush holder plate that faces the brush, and disposing the brush at the end of the motor close to the fan, the heat dissipation of the brush is greatly enhanced, thus prolonging the lifespan of the brush. At the same time, the brush holder plate defines openings aligned with the stator, such that the airflow generated by the fan can be used to dissipate heat from the stator windings, which effectively enhances the heat dissipation of the motor. In addition, the segmented brush holder reduces the material cost of the brush holder.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A brush assembly for an electric motor, comprising a brush holder and a brush slidably mounted to the brush holder, the brush holder comprising a brush holder plate and a side portion extending from the brush holder plate, the brush being arc-shaped and comprising a first surface contacting the brush holder plate and a second surface contacting the side portion of the brush holder, wherein the side portion of the brush holder comprises a plurality of ribs contacting the second surface of the brush;
   wherein a through hole is formed between adjacent ribs of the side portion of the brush holder, the brush holder plate has at least two elongated projections that support the first surface of the brush and have a shape corresponding to the shape of the brush.

2. The brush assembly of claim 1, wherein surfaces of the ribs that contact the brush are curved surfaces.

3. The brush assembly of claim 1, wherein the brush holder plate defines a plurality of openings there through aligning with the first surface of the brush.

4. The brush assembly of claim 1, wherein at least part of the openings of the brush holder plate are formed between the two elongated projections.

5. The brush assembly of claim 1, wherein the brush comprises a first end for contacting a commutator of a motor, and a second end opposite to the first end, the brush assembly further comprises a resilient element contacting the second end of the brush to bias the brush toward the first end of the brush.

6. An electric motor comprising a stator, a rotor rotatable relative to the stator, a commutator fixed to the rotor, and the brush assembly of claim 1, engaged with the commutator.

7. The motor of claim 6, wherein surfaces of the ribs that contact the brush are curved surfaces.

8. The motor of claim 6, wherein the brush holder plate defines a plurality of openings there through aligning with the first surface of the brush.

9. The motor of claim 8, wherein the brush holder plate has at least two elongated projections that support the first surface of the brush and have a shape corresponding to the shape of the brush.

10. The motor of claim 9, wherein at least part of the openings of the brush holder plate are formed between the two elongated projections.

11. The motor of claim 6, wherein the brush comprises a first end for contacting the commutator, and a second end opposite to the first end, the brush assembly further comprises a resilient element contacting the second end of the brush to bias the brush toward the first end of the brush.

12. A blower incorporating the motor of claim 8, and a fan driven by the motor.

13. The blower of claim 12, wherein the brush assembly is disposed between the motor stator and the fan, the stator has stator windings, the brush holder defines an opening aligned with the stator windings, and the brush assembly is disposed at an axial end of the motor adjacent to the fan.

14. The blower of claim 12, wherein surfaces of the ribs that contact the brush are curved surfaces.

15. The blower of claim 12, wherein the brush holder plate defines a plurality of openings there through aligning with the first surface of the brush.

16. The blower of claim 15, wherein the brush holder plate has at least two elongated projections that support the first surface of the brush and have a shape corresponding to the shape of the brush.

17. The blower of claim 12, wherein the brush comprises a first end for contacting the commutator, and a second end opposite to the first end, the brush assembly further comprises a resilient element contacting the second end of the brush to bias the brush toward the first end of the brush.

\* \* \* \* \*